Jan. 25, 1949.  J. J. ALIKONIS  2,459,908
METHOD FOR MAKING CONFECTIONERIES
Filed July 11, 1946
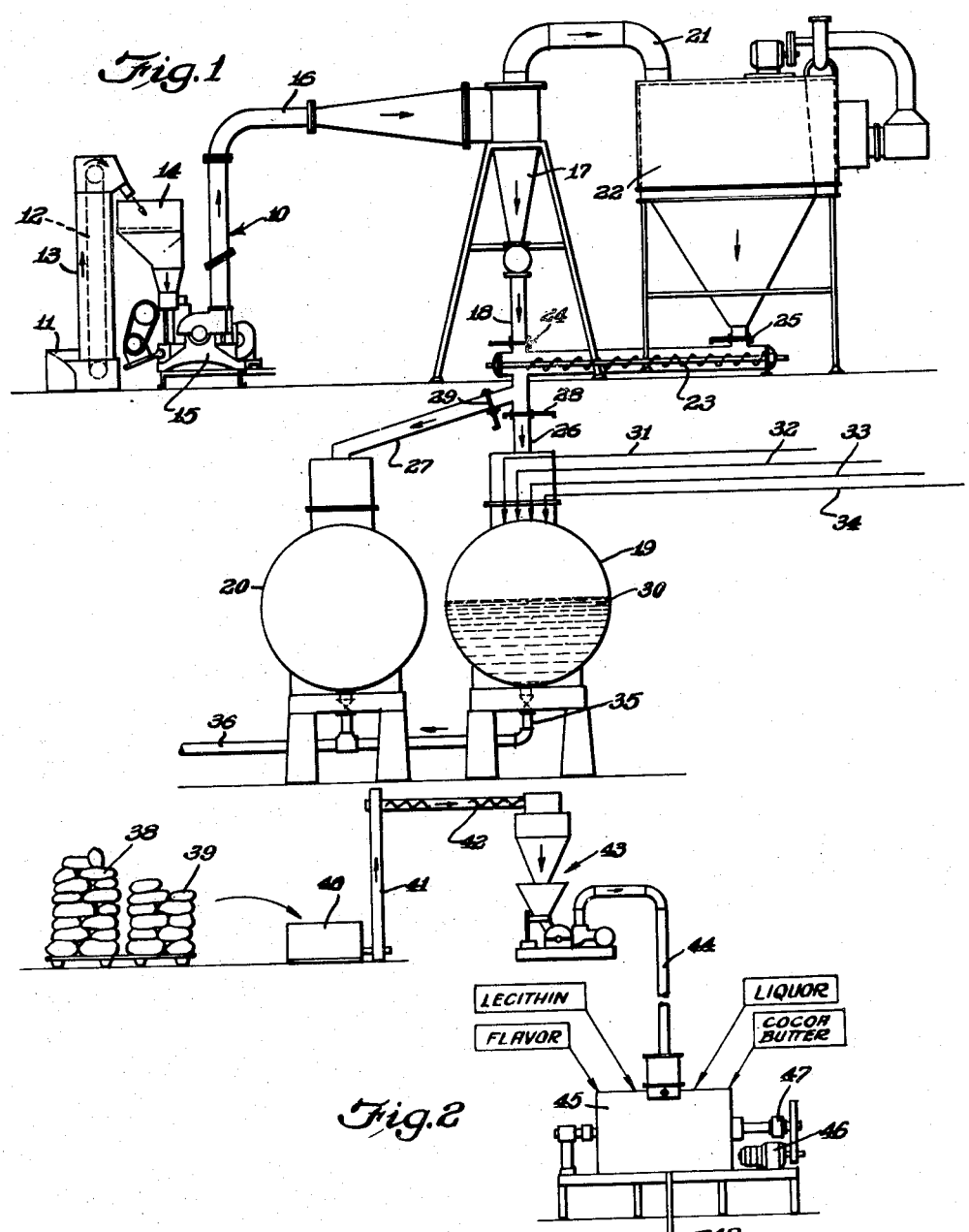
INVENTOR.
Justin J. Alikonis
BY
Cromwell, Greist & Warden
Atty's.

Patented Jan. 25, 1949

2,459,908

UNITED STATES PATENT OFFICE 2,459,908

METHOD FOR MAKING CONFECTIONERIES

Justin J. Alikonis, Bloomington, Ill., assignor to Paul F. Beich Company, Bloomington, Ill., a corporation of Illinois Application July 11, 1946, Serial No. 682,771

2 Claims. (Cl. 99—23)

This invention relates to a method of making a chocolate confectionery of superior taste, texture and aroma, and to an apparatus for performing the method.

It is an object of the invention to provide a method of manufacturing chocolate confectionery which reduces the time and labor factors involved in said manufacture approximately 75%, likewise effecting comparable savings in power and equipment, hence in factory space.

A further object is to provide a method of chocolate confectionery manufacture characterized by high capacity output per unit of time, labor and equipment, notwithstanding which the product is characterized by an exceedingly fine quality, superior to that of chocolate confections produced by time-honored, existing methods.

More specifically, it is an object of the invention to provide a method and apparatus for the manufacture of chocolate confections, characterized by the initial dry admixture and grinding of all dry ingredients as a single and only step preceding the addition of said ingredients to the chocolate liquor and other liquid ingredients in a Stehling tank or suitable mixing tank, as distinguished from well-known multiple grinding, melanging, refining and conching procedures now relied on in the manufacture of such confections.

Additionally, it is an object to provide a method characterized by a single "dry" grinding and mixing of all dry ingredients to a particle size of the order of or not greater than, 25 microns, followed by a mixing of these ingredients directly with an independently prepared properly proportioned charge of chocolate liquor, with or without additional flavoring, emulsifier and other ingredients of a liquid nature.

Yet another object is to provide a method of manufacturing chocolate wherein one and only one operation occurs which has as its primary purpose the reduction of the particle size of the ingredients, this being a dry grinding or pulverizing operation followed by mixture of said ingredients with a chocolate liquor preparation, and attended by oxidation and other chemical actions which improve the flavor of the product and decrease the residual harshness and acridity normally imparted to said product by the chocolate liquor.

A still further object is to provide a novel and improved apparatus for performing the method of the invention.

The foregoing statements are indicative in a general way of the nature of the invention, but other and more specific objects will be apparent to those skilled in the art upon a full understanding of the construction and operation of the device.

Two different embodiments of the apparatus for performing the improved method are illustrated herein for the purpose of exemplification, but it will be appreciated that the invention is susceptible of incorporation of other modified forms coming equally within the scope of the appended claims.

In the drawings,

Fig. 1 is a schematic or diagrammatic view illustrating a commercial system for performing the process of the invention, in which a continuous output is possible, as distinguished from a batch operation, this system including means for recovering dust from an initial pulverizing operation which would normally be lost; and Fig. 2 is a schematic view, illustrating other simplified apparatus for performing the method, indicating the subdivision of the method into two steps of dry grinding or pulverizing the dry ingredients and subsequent mixing with the liquid ingredients.

The manufacture of chocolate confections has in the past been invariably conducted in accordance with certain time-honored customs and procedures, and by the use of certain generally accepted, standardized types of machinery, uniformly characterized by the consumption of excessive time and labor, without achieving an excellence of product which might normally be expected. No attempt has heretofore been made to depart from these stereotyped procedures, regardless of the fact that they are so consuming of time, labor and space as to be remarkable in the present era. The present process aims to, and does, greatly minimize the complexity of operations involved in the manufacture of a high quality chocolate product, relying primarily upon an exceedingly fine grinding or pulverizing of the dry ingredients, primarily sugar, as an initial step followed by direct admixture of a properly proportioned charge of said dry ingredients with a proportioned volume of chocolate liquor, with or without other flavoring and like materials.

For clarity of understanding of previous procedures as well as the improvements herein contemplated, the term "chocolate liquor" as herein used is defined as the product obtained by grinding cacao nibs free from shells or husks and germs, usually through triple stone mills, Bausman disk, roller mills, or similar devices. From this chocolate liquor unlimited blends of chocolate confections may be derived, depending upon the particular variety of cacao bean employed, the particular percentages and types of sugar, cocoa butter, milk solids and flavors combined therewith, the fineness to which the ingredients are milled, and the adjustment to various viscosities and colors. Well known examples are sweet chocolate, which by federal pure food law must contain at least 15% by weight of chocolate liquor; bitter sweet chocolate, which must contain at least 35% by weight of chocolate liquor; and milk chocolate, which must contain at least 10% by weight of chocolate liquor, combined with milk solids and sugar, plus salt and flavor if desired.

All of these three popular varieties are compounded on the basis of a chocolate liquor produced in the manner defined above, else they are not entitled to be described by the term "chocolate" under law. Various other types of confections compounded from mixtures of cocoa powder or ground cocoa (as distinguished from chocolate liquor) sugar, fatty material and flavoring ingredients are not defined by the federal pure food laws and are commonly described as imitation coatings. They lack the true flavor and taste of pure chocolate, and are a class of product not contemplated by this invention.

In the conventional method of chocolate manufacture, the ingredients, for example prepared chocolate liquor, sugar (previously ground to a powder in a standard sugar mill), salt, flavor and powdered milk solids, in the case of a milk chocolate, are all batch weighed into a melangeur for initial mixing. A common type of melangeur is a roller mill having two large granite rollers suspended on an overcarriage and riding on a heated, rotating, steel or granite bed, scrapers being provided to guide the material under the rollers. The melanging operation requires about 45 to 60 minutes per batch and results in a mixture having a heavy paste-like consistency.

This intermediate product is then charged to a refiner for secondary processing. The refiner usually includes five vertically arranged, water cooled, steel rollers revolving at different speeds, ranging from about 20 R. P. M. for the bottom roll to about 100 R. P. M. for the top one. These rollers are perfectly machined to a very close tolerance to exert an even pressure throughout their travel. The chocolate paste produced in the melangeur is fed into the bottom pair of rolls, which spread it into a thin film that is carried up through the succeeding rollers at the increased speed of each successive roll. Very careful adjustment is necessary, since the fineness of the ultimate product depends entirely upon the spacing of the rollers and their speed. The refiner subjects the chocolate particles to a composite grinding and tearing action which results in a further reduction in particle size. This is the sole purpose of the refiner. A typical five-roller refiner as described has a capacity of about 400 to 600 pounds per hour.

Leaving the refiner, the chocolate compound falls as a flaky powder into a conveyor to be sent to a conche for the third step in processing. Kneading in the conche yields a product of improved flavor and smoothness. The ordinary conche consists essentially of a large heated tank having a concave bed of granite or steel, the ends of which are curved. In this tank a roller is continuously reciprocated to and fro by means of a crank, kneading the chocolate compound against the bed with a composite rolling and beating action, the latter occurring when the chocolate mass in front of the roller strikes the curved ends of the bed and is thrown to the back of the roller. A typical conching period ranges from 96 to 120 hours. The quality of the result achieved thereby is to a great extent determined by the quantity of chocolate charged to the conche and the size of the machine.

After conching, the chocolate is pumped to storage tanks known as Stehling tanks, wherein the chocolate is stored and constantly agitated until used. A conventional type of Stehling tank has a capacity of 13,000 pounds and is powered by a 10 H. P. motor.

It should be understood that if the preparatory grinding of the cacao nibs has been satisfactory, the solid particles in the chocolate liquor will be very small. Thus, grinding in a triple mill equipped with aloxite grinding stones with proper feathering and fineness of grit, the chocolate liquor produced will pass through a 325 mesh screen; however, in older processes the nibs are usually ground to pass through only a 200 mesh screen, further processing taking place in the refiner. However, following conventional grinding or pulverizing of sugar, the resulting particles still remain sufficiently great in size to appear gritty between the teeth in the final product. A very small quantity of sugar insufficiently ground will impart this effect. It is not at all uncommon for an appreciable amount of the chocolate mass to pass untouched past the outer edges of the refining mills, with resultant insufficient grinding of the sugar referred to above.

Those skilled in the chocolate making art have heretofore been unsuccessful in reducing the amount of time and labor consumed in its manufacture through the foregoing four-stage procedure. Notwithstanding the multiplicity of grinding, refining, kneading and mixing operations, the product has remained comparatively inferior and non-uniform in quality and aroma.

In the present method of preparation and mixing of the ingredients, a measured charge of prepared chocolate liquor is placed at once in the Stehling tank and the dry ingredients, ground and mixed as a single operation, are delivered directly to the liquor in the Stehling tank for mixing and storage. A finer grain size characterizes the dry ingredients and better blending and stabilization are possible than in the four-stage, wet process described above.

In Fig. 1 I illustrate diagrammatically a commercial installation for practicing the method of the invention. The reference numeral 10 in general designates a conventional, mechanical, screenless type pulverizer, characterized primarily by its ability to produce very fine powders, of particle size from one to 25 microns. The features of construction of this apparatus per se constitute no part of the present invention, hence it will suffice to state that a corresponding machine is available on the market as a product of the Pulverizer Machinery Company, of Summit, New Jersey, being designated by the name "Mikro-Atomizer." The comparative figures hereinafter given, as they relate to the performance of this apparatus, pertain to a system in which a model No. 6 "Mikro-Atomizer" is incorporated.

The dry materials, i. e., sugar, salt, dry flavoring ingredients, powdered milk solids, and the like, are charged to the hopper 11 of a mechanical bucket type elevator 12 enclosed in a suitable housing 13, whence they are discharged to the storage hopper 14 of the pulverizer. From this hopper they are fed by gravity to the grinding apparatus per se of the pulverizer, designated 15, where the ingredients are ground to such an extent that approximately 99.5% thereof will pass through a 325 mesh screen. The pulverized product is then blown upwardly and laterally through the discharge duct 16 of the grinder 15.

About 85% of the pulverized material passes downwardly into the funnel-like entrance 17 of a hollow supply line 18 leading ultimately to the Stehling tanks 19, 20 located on a lower level. The remaining 15% is blown upwardly and laterally through a conduit 21 to a standard type automatic unloading dust collector, generally designated 22, and is returned laterally at desired intervals to the line 18 by a screw-type conveyor 23. A control valve or shutter 24 is interposed in the supply line 18 above the discharge side of the screw conveyor and a similar shutter 25 is disposed between the dust collector 22 and the inlet side of said screw conveyor. Thus the feed of pulverized material to the Stehling tanks is at all time under the control of the personnel operating the apparatus.

The feed line 18 is divided into two branches 26, 27 below the screw conveyor 23, leading to the respective tanks 19, 20, each of these branches being controlled by a sliding shutter designated 28, 29, respectively. Pulverized dry materials feed past these shutters, when open, by gravity, directly to the respective tanks 19, 20. It should be noted that the transfer of the pulverized materials to tank 19 or 20 is effected immediately, and without intervening handling, after the pulverizing operation, and as a continuous procedure. This avoids the possibility of caking, cohesion or agglomeration of the finely divided particles, and insures the retention of the desired, very small particle size. Said tanks may be filled to the desired extent with a proportionate charge of prepared chocolate liquor 30, as pointed out above, supplied through a suitable line which is schematically shown and designated 31. Other constituent liquid materials such as flavoring, lecithin and cocoa butter are similarly supplied to the tank through lines 32, 33 and 34. It will be understood that similar supply provisions will be provided to service both tanks, one set having been omitted for clarity of illustration.

I have not illustrated in detail the structural features of the Stehling tanks, since they are of a conventional type well understood by those skilled in the art. Each tank has a valve controlled outlet 35 discharging to a common line 36 leading to a molding department, enrober, or other location, as will be understood.

By the above process and equipment, it is possible to produce dry ingredients pulverized to an extent wherein only an insignificant per cent exceed a size of 20–25 microns. What is more, this pulverization takes place at the rate of 500 to 700 pounds per hour. Finer grinds may be had at lower capacities and coarser grinds at higher capacities; hence, regulation of the output of the pulverizing apparatus 10 enables regulation of the quality of the resultant chocolate, coarse, medium, fine or very fine. Fineness of texture is the factor which is most important in determining the fitness of a chocolate coating for confectionery use.

In this connection it is worthy of note that in a good conventional initial grind for standard chocolate making operations a substantial percentage of the sugar particles exceed 200 microns in size whereas after the initial pulverization of dry ingredients in the present method, in a commercial run, the predominant bulk of particles, including sugar, are of less than 2 microns size. A negligible percentage range up to 25 microns, and none exceed that size.

After the dry constituents are discharged to the Stehling tank and mixed with the liquid ingredients, the chocolate is stabilized by the coating of every particle of sugar with a thin film of cocoa butter. Viscosity can be closely controlled as the ingredients are charged to the tanks. Smoothness of taste is increased by the rounding off of the sharp edges of the sugar crystals. Additional flavor is developed by the oxidation of the cocoa tannins and chemical inter-action of the various ingredients. For example, the sugar is slightly caramelized and slightly decomposed.

An important advantage of this method is that the sugar added to the chocolate liquor in the tanks 19, 20 drives off moisture and a considerable quantity of volatile acids in the liquor, with a corresponding decrease in the residual harshness and acridity which would normally be imparted to the chocolate product by the chocolate liquor.

It will be evident that the charging and discharging of tanks 19, 20 may be continued successively after a charge in one thereof has been drawn off, so that this process has the benefit of continuity of operation, with resultant high capacity production. For example, by the conventional method of chocolate production previously described, the labor of 11 men, 10 hours apiece, and a total power consumption of about 334 H. P. are required to produce 25,000 pounds of chocolate. By the improved method according to this invention, the same amount of chocolate, but of finer quality and aroma, is produced by only two men working 10 hours each, and consuming only 125 H. P. Moreover, over 80% in saving of space is effected.

In Fig. 2 I illustrate a somewhat simpler apparatus, but one which performs essentially the same method as that described above. Here the dry ingredients, designated 38 and 39, are charged manually or otherwise into a receiving hopper 40, from which they are elevated by a bucket elevator 41 and transported laterally by screw conveyor 42 to a pulverizing apparatus 43 of the same general type as described above. From this apparatus the ground ingredients discharge through a conduit 44 directly to the Stehling tank 45, the dust collector of Fig. 1 being omitted. The various other ingredients such as chocolate liquor, cocoa butter, lecithin, and flavoring material are likewise added to the tank, as schematically illustrated. The agitating apparatus (not shown) of tank 45 is driven by a motor 46 and speed reduction drive 47. Discharge of the mixed and stored chocolate ingredients takes place through the line 48.

It will be apparent to those skilled in the art that the simplified apparatus eliminates from the chocolate making process, not only the cost, expense of maintenance, power and personnel required in the operation of melangeurs, refiners, and conches, but it also eliminates the uncertain factors of adjustment and operation inevitably introduced by such instrumentalities. Substituted therefor is a simple two-stage operation involving essentially only a pulverizing apparatus and one or more Stehling tanks, the operation, adjustment and maintenance of which are relatively simple matters. I believe it is novel with me to provide such a method in which all dry ingredients are introduced, directly and in fully pulverized condition not requiring any further preparatory treatment, into the Stehling tank for initial contact with the chocolate liquor. The pulverizing action performed by the apparatus 10 of Fig. 1 and 43 of Fig. 2 is the initial and only dry grinding operation and it is the only operation having the reduction of particle size of the ingredients as its primary object.

I am aware that it has been proposed to mix cocoa powder, as distinguished from ground chocolate, in a dry state with other dry ingredients of a confectionery product, requiring subsequent screening out of fibre and other foreign articles. In addition to not requiring such screening at any phase, the present process contemplates a mixture in the Stehling tank of the chocolate liquor with the dry ingredients, excluding chocolate, following complete and final grinding of said dry ingredients.

I claim:

1. A continuous method of making liquor-derived chocolate confectionery, comprising the steps of concurrently and as a single continuous operation pulverizing predetermined proportions of certain dry ingredients other than cacao ingredient and including sugar to a particle size sufficiently small that approximately 99.5% of said pulverized ingredients will pass a 325 mesh screen, and immediately thereafter discharging and mixing said pulverized dry ingredients as a single continuous operation with a predetermined volume of liquid ingredients including chocolate liquor prepared from cacao nibs, said mixing being carried out without intervening handling of said pulverized ingredients tending to result in cohesion of particles thereof.

2. A continuous method of making liquor-derived chocolate confectionery, comprising the steps of concurrently and as a single continuous operation pulverizing to an ultimate particle size of not greater than 25 microns predetermined proportions of certain dry ingredients other than cacao ingredient and including sugar, and immediately thereafter discharging and mixing said pulverized dry ingredients as a single continuous operation with a predetermined volume of liquid ingredient including chocolate liquor prepared from cacao nibs, said mixing being carried out without intervening handling of said pulverized ingredients tending to result in cohesion of particles thereof.

JUSTIN J. ALIKONIS.

REFERENCES CITED

The following references are of record in the file of this patent:

UNITED STATES PATENTS

| Number | Name | Date |
|---|---|---|
| 1,364,192 | Friedman | Jan. 4, 1921 |
| 1,897,242 | Defren | Feb. 14, 1933 |
| 2,336,346 | Carver | Dec. 7, 1943 |
| 2,356,181 | Rubens | Aug. 22, 1944 |
| 2,398,945 | Lawton | Apr. 23, 1946 |